Nov. 10, 1936. C. B. WOODWORTH 2,060,780
LIFTING JACK
Filed July 24, 1935
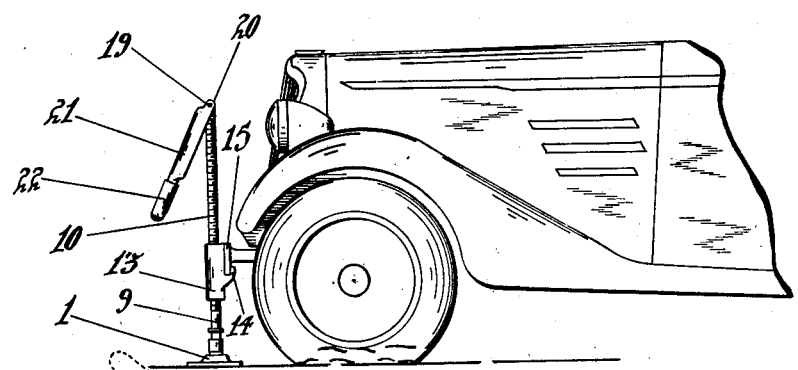
Fig.1.
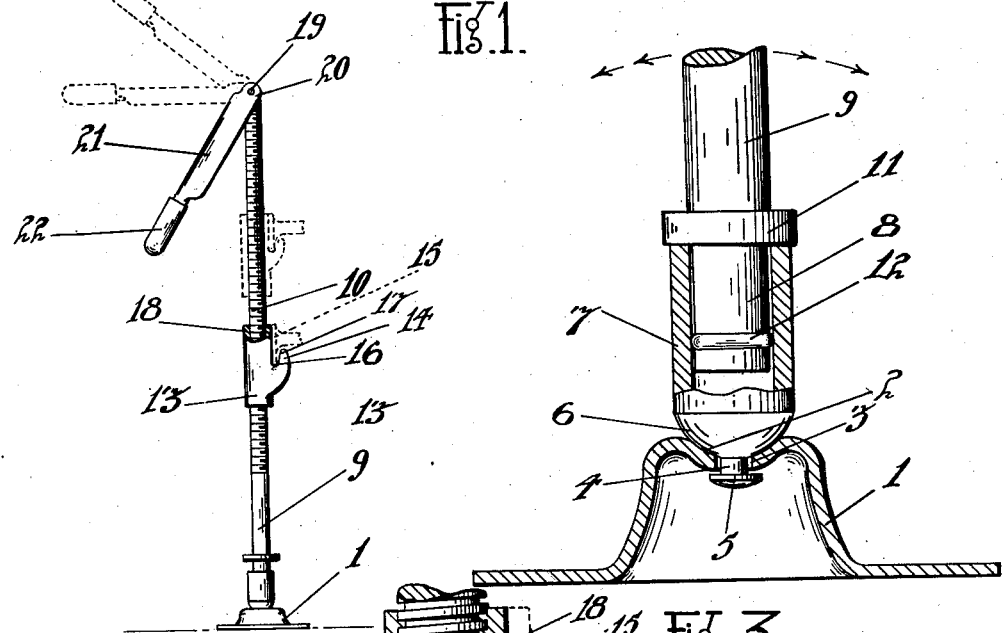
Fig.2. Fig.3.
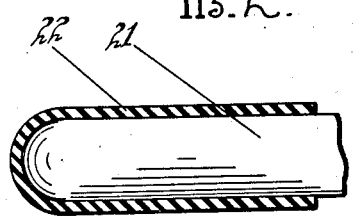
Fig.5. Fig.4.
INVENTOR.
CHARLES B. WOODWORTH.
BY 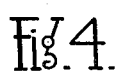
ATTORNEY.

Patented Nov. 10, 1936

2,060,780

UNITED STATES PATENT OFFICE 2,060,780

LIFTING JACK

Charles B. Woodworth, Port Dickinson, N. Y.

Application July 24, 1935, Serial No. 32,930

4 Claims. (Cl. 254—100)

My invention relates to lifting jacks and has for its primary purpose the provision of a jack designed to raise automobile wheels above the ground or other support for changing tires, by engagement with the bumper bar or the like carried by the body of the car.

With the present design of automobile body construction, with overhanging fenders, etc., it has become increasingly difficult to use the conventional and ordinary type of lifting jack designed to engage beneath the axle of the wheels to lift the same for changing a tire. Likewise on automobiles provided with individual wheel suspension it is difficult to use the old type of jack for this purpose.

I have designed a lifting jack which may be readily engaged with the bumper bar of the car and whereby through the medium of the bumper bar or support, the body of car and wheel can be raised a sufficient distance above the ground to permit ready changing of the tire. This enables this operation to be accomplished with a maximum amount of ease and convenience inasmuch as the bumper bar is in a free and readily accessible position.

One particular object of my invention lies in the provision of an engaging device for the bumper bar by means of which a substantial engagement is provided and without danger of bending the bar during the lifting and supporting operation.

A further object lies in the provision of a pivoted handle for the jack screw by means of which the same may be readily folded down alongside the screw out of the way or raised to any desired angular position for convenience in turning, and by means of which pivoted handle rotation of the screw may be accomplished without interference with the radiator, headlights, fenders, or other part of the car body.

Still another object lies in the provision of a protective friction handle piece or hand grip.

Other objects and advantages will be apparent as the description proceeds, reference now being had to the figures of the accompanying drawing forming a part of this application and wherein like reference numerals indicate like parts.

In the drawing:

Figure 1 is a side view of a part of an automobile with my improved lifting jack in position for operation.

Figure 2 is a side view of my improved lifting jack.

Figure 3 is a detail sectional view of the base of the jack, certain parts being in section and certain parts being broken away for clearness of illustration.

Figure 4 is a detail sectional view of a portion of the jack screw and the lifting member thereon.

Figure 5 is a detail view partly in section illustrating the frictional hand grip for the handle.

The reference numeral 1 refers to the supporting base of my improved jack and which may be of any desired size and shape. Centrally the base is provided with a semi-cylindrical concave seat 2 provided with a central opening 3 through which it is adapted to receive a pin 4 provided with the head 5. The pin 4 is fixed rigidly to the central portion of a semi-spherical convex end 6 of a hollow socket 7 into which is adapted to project the lower end 8 of the screw rod 9 threaded for the greater part of its length as at 10. The screw rod 9 is provided with a collar 11 adapted to engage the upper end of the socket 7 and within the socket 7 the end 8 of the screw rod is provided with a spring ring or other friction device 12 adapted to frictionally engage the inner walls of the socket and prevent inadvertent displacement of the screw rod within the socket.

The opening 3 in the base 1 is substantially larger than the pin 4 whereby a substantial amount of rocking movement is made possible between the convex socket end 6 and the concave portion 2 of the base 1. This is to permit angular adjustment of the screw rod as may be desired or necessary in the use thereof and in addition renders the rotation of the socket in the base easy.

It will be understood, of course, that the screw rod 9 is removable from the socket 7 by simply pulling the same therefrom against the tension and resilience of the friction device 12.

Threadably mounted upon the screw rod 9 and engaging the threads 10 thereof is a lifting collar 13 internally threaded to receive the threads 10 of the screw rod and adapted for adjustment longitudinally of the screw rod either by holding the screw rod stationary and rotating the collar or by holding the collar stationary and rotating the screw rod. The lifting collar 13 is provided at one side with a hook shaped portion 14 adapted to receive and engage the underside of the bumper bar 15 of an automobile. The lower seat portion 16 of the hook 14 is of such a size and shape as to readily receive the lower edge of the bumper bar and the hook 14 is angled slightly away from the sleeve as at 17 to accommodate the thickness of the bumper bar and to adapt it to receive bars of different shapes and thicknesses, and to provide a wedging action between the hook and bar and thus preventing sliding action of the hook on the bar.

The sleeve 13 is provided above the hook 14 with an elongated portion 18 of a length substantially equal to the width of the bumper bar 15 whereby the full broad face of the bumper bar engages thereagainst and thus provides support during the lifting operation for the screw rod and thus eliminating the danger of bending or distorting the same, due to the load being on one side of the rod.

The upper end of the screw rod 9 is provided with a pivot pin 19 to which is suitably pivotally secured the bifurcated end 20 of a handle 21 preferably formed of metal bent to channel shape though obviously the handle may take other forms. The extreme end of the handle 21 is provided with a hand grip 22 of rubber, leather composition or the like, which prevents the hand of the operator from slipping therefrom and also provides a protective means against marring the finish of the automobile in case the handle inadvertently strikes the same.

The handle 21 by virtue of its pivotal connection with the upper end of the screw rod may be folded downwardly alongside the screw rod or lifted to any desired angle with respect to the screw rod and whereby such screw rod may be rotated to cause the sleeve 13 to move up or down thereon.

In operation the sleeve 13 is rotated on the screw rod to a position just below the bumper bar 15. The jack is then placed in proper position with respect to the bumper bar and the sleeve 13 held against rotation and the screw rod rotated until the hook 14 engages the bumper bar whereupon continued rotation of the screw rod causes the sleeve 13 to move upwardly thereon lifting the bumper bar therewith until the body of the car and the wheel has been raised sufficiently above the ground or other support to permit changing the tire or wheel thereon.

Similarly rotation of the screw rod in the opposite direction lowers the bumper bar and wheel and the tire again engages the ground whereupon the jack may be removed, the handle folded downwardly and the same stored away conveniently. If desired, the base 1 and socket 7 may be removed also from the screw rod, as previously explained.

The rocking movement permitted for the screw rod 9 on the base 1 compensates for any irregularities or unevenness of the surface upon which the jack is placed for the lifting operation.

Of course, changes may be made in details of construction and arrangement of parts without departing from the spirit and scope of my invention. I do not limit myself, therefore, to the exact form herein shown and described other than by the appended claims.

I claim:

1. A lifting jack comprising a screw rod and lifting member thereon, and a handle attached to the upper free end of said screw rod for rotating the same, said handle being pivoted for folding alongside the same and for movement to selective positions to permit the handle to swing across the top of the screw rod.

2. A lifting jack comprising a screw rod and lifting member thereon, and a handle attached to the upper free end of said screw rod for rotating the same, said handle being pivoted for folding alongside the same and for movement to selective positions to permit the handle to swing across the top of the screw rod, said handle being of channel form to permit folding closely against said screw rod.

3. A lifting jack comprising a screw rod and lifting member thereon, and a handle attached to the upper free end of said screw rod for rotating the same, said handle being pivoted for folding alongside the same and for movement to selective positions to permit the handle to swing across the top of the screw rod, said handle being of channel form to permit folding closely against said screw rod, and having a frictional protective hand grip on the end thereof.

4. A lifting jack comprising a screw rod and handle for turning the same, a lifting member thereon for adjustment longitudinally of said rod as the same is turned, a base for supporting said rod, and a ball-like connection between said rod and said base, said connection comprising a socket receiving the end of said rod and said socket having a rounded end loosely connected to a concave portion of said base, and a collar on said screw rod engaging the upper end of said socket.

CHARLES B. WOODWORTH.